March 31, 1970     R. L. EVANS     3,503,783

PROCESS OF FORMING METAL COATING ON FILLED MICROCAPSULES

Filed July 12, 1965

INVENTOR.
ROGER L. EVANS
BY
Carpenter, Kinney & Boulter
ATTORNEYS

United States Patent Office 3,503,783
Patented Mar. 31, 1970

3,503,783
PROCESS OF FORMING METAL COATING ON
FILLED MICROCAPSULES
Roger L. Evans, Mendota Heights, Minn., assignor to
Minnesota Mining & Manufacturing Company, St. Paul,
Minn., a corporation of Delaware
Filed July 12, 1965, Ser. No. 471,020
Int. Cl. B05c 3/00; B44d 1/34
U.S. Cl. 117—47                                    5 Claims

ABSTRACT OF THE DISCLOSURE

Microcapsules each having an organic shell containing fill which is capable of permeating the shell and a continuous outer coating of metal which reduces the permeability of the shell by the fill by at least 50 percent. The outer metallic layer is formed on the microcapsules by treating them successively with particular catalytic aqueous solutions containing stannous, silver and paladium ions and then with a metal coating aqueous solution containing the ion of the metal to be coated and a reducing agent therefor. Also disclosed are copysheets comprising an electrically conductive backing and a layer of the metalcoated microcapsules.

---

This invention relates to novel microcapsules which have relatively impermeable outer layers, to a process of preparing such microcapsules and to constructions containing them.

Microcapsules and microencapsulated products as well as various techniques for their preparation have been described in the literature. Their application in some areas has been hindered, however, by permeability and leakage under some conditions. This permability is related to such factors as shell material, conditions of microcapsule preparation, previous treatment, conditions of use, size, ratio of diameter to shell thickness etc. Other materials with which the microcapsules come into contact frequently affect their permeability. Thus polar solvents (such as lower ketones, alcohols, esters, etc.) for polymer systems with which the microcapsules are often used (e.g. for coating on web or sheet backings) frequently cause leakage of fills from the capsules.

It is an object of this invention to provide impermeable microcapsules.

It is another object of this invention to provide microcapsules which are essentially unaffected by polar solvents such as lower ketones, alcohols and esters.

It is another object of the present invention to provide microcapsules having exterior impermeable metal layers thereon.

It is another object of the present invention to provide a process for the preparation of microcapsules with metal coatings thereon which are impermeable for most conditions of use.

It is still another object of the present invention to provide sheet constructions containing microcapsules having impermeable exterior metal coatings thereon.

It is still another object of the present invention to provide image recording media containing microcapsules which have impermeable metal coatings thereon.

It is a further object of this invention to provide a copysheet and a dry recording process capable of reproducing black and white and colored images.

Other objects of the invention will become apparent from reading the following specification.

Figure 1:
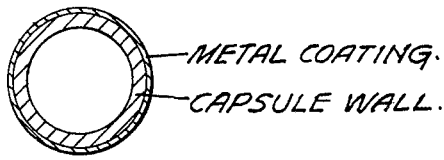
FIGURE 1 is an enlarged cross-sectional view of the metal-coated microcapsule as formed by the process of this invention.

In accord with the above and other objects of the invention microcapsules are provided each of which comprises an organic shell containing fill which is capable of permeating the shell and a continuous, impermeable outer coating of a metal which is capable of electroless deposition onto a dielectric surface, the metal coating reducing the permeability of the shell by the fill by at least 50 percent, the fill making up at least 20 percent of the total microcapsule weight. FIGURE 1 shows a metal-coated microcapsule according to the invention. The permeability of the metal coated microcapsules is determined in acetone as set out hereinafter. Ordinarily the permeability of the shell by the fill is reduced by a factor of 90 percent or more in the microcapsules of the invention (compared to the precursor microcapsules which do not have the impenetrable metal coating) and in some cases it is rendered completely impermeable (as is required in certain applications).

These microcapsules have diameters not greater than about 2000 microns and preferably not greater than about 200 microns. The impermeable exterior metal coatings are ordinarily about 0.2 to 4 microns in thickness and make up not more than about 20 percent of the total capsule volume. The fill generally makes up from about 20 to 50 percent by weight of the capsules of the invention.

The capsules of the invention can be prepared by coating organic-shelled (frequently polymeric shelled) microcapsules with metal utilizing a process of electroless deposition (which is another aspect of the invention). Ordinarily these precursor microcapsules comprise a liquid or solid fill particle inside a hollow shell (which is usually about 0.2 to 4 microns in thickness) or a bead of porous organic material, such as a starch bead, containing the fill. The fill normally makes up about 60 to 95 percent (by weight) thereof. The impermeable metal coatings can also be applied to precursor microcapsules already having metal exterior coats.

The process of the invention comprises (1) catalytically pretreating microcapsules by successively immersing them in aqueous solutions of pH 3 to 11 which are
  (a) 0.1 to 2 molar with respect to stannous ion,
  (b) 0.1 to 2 molar with respect to silver ion and
  (c) 0.01 to 0.5 molar with respect to palladium ion, (2) metal coating the pretreated microcapsules by immersing them in an aqueous solution which is 0.001 to 0.5 molar with respect to a metallic ion which is capable of electroless deposition into a dielectric surface, said solution being buffered to pH 3 to 11 and containing a reducing agent for the metallic ion, the duration of treatment in solutions (a) and (b) being sufficient that the surfaces of the microcapsules turn the pale brown color of colloidal silver in solution (b) and the duration of treatment in solution (c) being sufficient that the pale brown color disappears from the surfaces of the microcapsules and the yellow color of the palladium ion remains in the solution. This process is not limited to microcapsules in which the fill is capable of permeating or penetrating the shell.

Among the metals which are suitable for the external metal coatings are nickel, cobalt, copper, iron, gold, palladium and arsenic. A particularly preferred group includes nickel, cobalt, copper and iron. Suitable cell wall materials for the microcapsules to be metal coated include natural polymers and synthetic polymers (such as polyvinyl alcohol, polypropylene. urea formaldehyde resins, etc.), gelatin, carnauba wax, and other gelled film-forming hydrophilic colloid materials, etc.

The amounts of the catalytic tin, silver, and palladium applied to the surfaces of the microcapsules during this process are very minute. In fact all three are invisible at all times except for color. Each, however, is necessary to the forming of the final impermeable coating. The reason for this is not known but it may be that the silver is more easily reduced by the stannous ion than is the palladium and more thoroughly covers the whole substrate surface and when the palladium is exchanged for the silver, it covers the surface in the thorough pattern established by the silver. The microcapsules are ordinarily washed in water between the chemical solutions in order that subsequent reactions take place exclusively on the capsule surfaces. Also it is sometimes desirable to add surface active agents and/or solvents to the solutions so that they will more completely wet the surfaces of the microcapsules.

Care must be exercised to use conditions (e.g. pH and temperature ranges) to which the organic capsule shell is insensitive to avoid premature rupture thereof. The catalytic and metal coating steps of the process are preferably carried out at 0° to 100° C. The catalytic steps are most conveniently carried out at room temperature (20–30° C.) and the metal coating is usually carried out at from about 20° to 65° C. In this range the coating takes place at a relatively high rate but the temperature is not sufficiently high to cause significant capsule rupture. The metal coating temperature can be raised, if desired, when less sensitive capsules are being used.

The duration of treatment in each solution is also important to the production of impermeable microcapsules. These treatment times are more conveniently determined by changes in appearance of either the microcapsules or of the particular treating solution than by elapsed time since the time required in each solution varies considerably depending upon the conditions of the reaction. Thus, as already noted, the duration of treatment in solutions (a) and (b) (containing tin and silver ions respectively) is sufficient that the surfaces of the microcapsules turn a pale brown color in solution (b) (often this is from about 2 to 20 minutes in each). If either the immersion in solution (a) or in solution (b) is too short, the light brown color of colloidal silver will not develop on the microcapsules. The end point of the treatment with solution (c) (which contains the palladium ion) is indicated by the disappearance of the light brown color of collodial silver on the microcapsule product with the simultaneous retention of the yellow color of the palladium ion in the treating solution. A convenient technique for determining the proper end point for the treatment in the palladium ion solution is to add the solution thereof in portions until the yellow color remains in the solution thus indicating an excess of palladium ions. Excessively long treatments in any of the catalytic solutions are unnecessary and can, under some conditions of pH and with certain microcapsule wall compositions, result in rupture of some of the microcapsules. The normal end point of the formation of the impermeable metal coating is when the coating reaction ceases. Usually this can be observed when the previously effervescing solution becomes quiescent. Leaving the microcapsules in this solution after the coating has stopped ordinarily does not affect the microcapsules since the organic walls are protected by the metal coating.

Chloride is the preferred anion in solutions (a) and (c) (the catalytic metals being added as stannous chloride and palladium chloride and hydrochloric acid being used to adjust the pH) since chloride is common and easily available, is monovalent (i.e. has a single charge) and causes no side oxidation reactions. Nitrate is the preferred anion in solution (b) since silver nitrate is the most easily available form of soluble silver. Solution (a) is preferably freshly prepared since the combination is unstable on aging. Stannous chloride reacts almost immediately with water when dissolved therein to give a white precipitate-said precipitate re-dissolving upon addition of the hydrochloric acid.

As noted previously the outer metal coatings of the capsules of the invention reduce the permeability of the shells by the fill by at least 50 percent. This is tested by comparing the times required for equivalent amounts of fill to penetrate comparable metal coated and control microcapsules (microcapsules of the same type not having the impermeable metal coating) the microcapsules being slurried in acetone under equivalent conditions. The relative amounts of fill which escape into the acetone are usually determined by absorption spectra. A convenient test procedure for accomplishing this is as follows:

(A) Determination of relative amounts of acetone and microcapsules to be added to the test slurries Equivalent slurries of metal coated and control microcapsules contain equal ratios of the total fill in the slurried microcapsules to the acetone. To prepare these slurries the weight percent of fill in each lot must first be determined. Usually this is done by first weighing then crushing a sample of capsules to release the fill, washing with solvent (e.g. acetone) to remove the fill material remaining with capsule shells, reweighing the shells, calculating the percent of weight lost and then determining the relative amounts of capsules and acetone needed for each slurry.

(B) Slurrying the control and metal coated microcapsules in acetone

Lot 1: Measured amounts of acetone and control microcapsules to make a 20 percent w./v. slurry (e.g. 20 grams of fill to 100 ml. of acetone) are mixed and maintained at 25° C. with agitation until an easily measured amount of fill has escaped into the acetone. The acetone and the control microcapsules are then separated and the time of contact between them is recorded.

Lot 2: Measured amounts of acetone and metal coated capsules to make a 20 percent w./v. slurry are mixed and maintained in contact at 25° C. with agitation for twice as long as in Lot 1.

(C) Determining the relative permeabilities of the control and metal coated microcapsules The relative concentrations of fill in the acetone from Lots 1 and 2 can be quantitatively compared at any wave length at which the fill has a major absorption (which is not masked by the solvent), e.g. in the infrared, ultraviolet or visual range. Tests which can be run visually (by comparing the intensity of color of the two acetone solutions) are often most sensitive and are by far the most conventient to run. If the concentration of fill in the acetone of Lots 1 and 2 is the same, the penetrability of the control microcapsules is twice that of the metal coated microcapsules (since the latter were in contact with the acetone twice as long as the former). If the concentration of fill in the acetone of Lot 2 is less than that in Lot 1, the microcapsules of Lot 1 are more than twice as penetrable as those of Lot 2, etc.

Many variations of the foregoing procedure are possible. Thus, if it is desired to determine whether the external metal coat on a particular lot of capsules has increased their permeability by a factor of ten, they are left in contact with acetone ten times as long as the control capsules. The permeabilities of the control and metal coated capsules can also be compared at other ratios of fill to acetone than 20 percent w./v. provided that both are run at the same ratio.

In some cases it may be difficult to determine the amounts of fill by absorption spectral methods in the presence of acetone. The acetone can then simply be removed and the remaining fill weighted or examined spectrally or it can be replaced (after removal of the microcapsules therefrom) by another solvent.

The degree of permeability of a sample of microcapsules in acetone can also be determined by placing in the acetone of each test slurry a reagent which reacts chemically with the fill material and then comparing the spectral response of the product of that reaction in the test solutions. Thus, for example, the fill and the acetone may contain complementary color formers which react together to form a color which can be compared visually.

Ordinarily the metal coated microcapsules of the invention are sufficiently impermeable so that less than one percent of their fill is lost in a slurry of the microcapsules in acetone in 15 minutes at 25° C. in which the ratio of the total fill in the slurried microcapsules to the acetone is 20 percent w./v. (sometimes expressed herein as containing 20 percent w./v. fill: acetone). This degree of impermeability to acetone can be shown by a comparative spectral examination of the concentrations of fill in acetone used in such an immersion test and in a standard solution containing 0.2 percent w./v. of fill in acetone.

The microcapsules of this invention are particularly useful in the fabrication of stable heterogeneous systems of components in which premature interreaction, leaching, color degradation, etc. must be avoided. For example, capsules of latent plasticizers can be mixed with solutions of plastics in polar solvents which, except for the impermeable outer coating, would permeate the shells of the capsules. Such systems can be used to prepare cast films of unplasticized plastics, containing capsules of plasticizer ready to be set free at some desired future time. Also, capsules containing a color-forming reagent can be dispersed safely, without reaction, into a solution of another reagent with which it normally forms a color. This solution may also contain binders, opacifiers, resins and the like, and be an intermediate in the manufacture of a coating, for example, on paper. Preferred solvents for such solutions are often polar organic liquids such as alcohols, ketones (e.g. acetone), esters (such as ethyl acetate) and the like. Such dispersions of microcapsules in these solvents have generally been unusable previously since the contents of the capsules have often been extracted by them.

An additional useful feature of the microcapsules of the invention is that they can generally be ruptured thermally, i.e. they can be physically displaced under the influence of heat by splitting, breaking, shattering, melting, decomposing, volatilizing and/or other displacement mechanisms, including internal pressure generation due to heating, to permit rapid penetration thereof by the fill when desired. The thermal rupture of the capsules is preferably accomplished by ohmic heating. The mechanism of rupture by ohmic heating probably involves high electric current density at a localized point on the electrically conductive outer metallic layer of the capsule. The thermal rupturability of the capsules can be demonstrated in the following manner. A tungsten wire (6 mil diameter, 0.2 inch long) is connected to a 100 microfarad capacitor which is charged to about 175 volts. The tungsten wire is brought into contact with a hollow microcapsule and the capacitor is discharged, the current surge heating the wire to about 800° C. Microscopic examination of the thus thermally pulsed microcapsule reveals any thermal rupture including the liberation of or revelation of the microcapsule contents. "Thermal rupturability" of filled or unfilled microcapsules is determined and defined in the above-described manner. The conductivity of the outer metallic layer is considerably greater than that of the underlying cell wall material.

Figure 2:
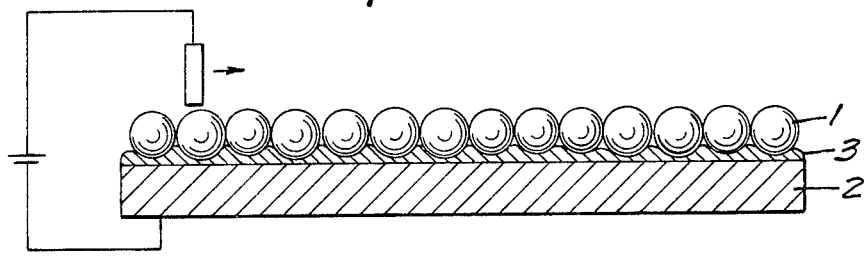
FIGURE 2 is a cross-sectional view of a sheet having a layer of metal-coated microcapsules.

The thermal rupturability feature of the microcapsules is of particular value in some end uses of the capsules, for example, in image reproduction. Thus, in one method for the reproduction of light images, the impermeable microcapsules may be incorporated into a sheet construction, shown in FIGURE 2, by providing a uniform layer 1 of such capsules on, and in electrical contact with, an electrically conductive substrate or sheet material 2, preferably by adhering the particles to the sheet by partially embedding them in the substrate or in an electrically conductive adhesive 3. The essentially spherical microcapsules should be of relatively uniform size and are preferably disposed in a manner providing inter-particle contact between adjacent microcapsules. If desired, an insulative binder may be used to fill the interstices between the capsules to assist in maintaining the physical integrity of the capsule layer. Such a sheet construction can be used for facsimile reproduction, the conductive backing being connected in the usual manner with a stylus traversing the surface of the sheet and constituting the other electrode, as shown in FIGURE 2. For such purposes the capsules contain suitable marking material, e.g. colored dyes or materials capable of color forming reaction, preferably liquids, which are released and become visibly discernible upon rupturing the capsule wall. Actual rupture occurs upon current passage between the stylus and the conductive backing, the current flowing through the electrically conductive capsule coatings. A tightly packed monolayer of capsules is sufficient, although several layers of capsules may be used if the packing density is such that electrical contact between capsules in the various layers is maintained and a continuous electrical path is provided from the stylus to the conductive backing. To insure effectively complete and uniform coverage of the backing with microcapsules, more than a monolayer is normally preferred, particularly if the diameters of the capsules vary significantly.

As mentioned earlier, the microcapsules used in image formation processes usually contain colored dyes or other substances which are released upon capsule rupture to form a visible indicium. One useful alternative procedure involves the encapsulation of a reactant which is capable of participating in a chemical reaction producing a color change. Such microcapsules can be incorporated into the sheet construction in random admixture with other microcapsules containing a suitable coreactant, simultaneous rupture permitting the color forming reaction to proceed. Instead of encapsulating all coreactants, one of the coreactant materials can be otherwise distributed in or adjacent to the microcapsule layer, where the release of capsule contents permits their admixture and causes the reaction to proceed. For example, if an acid sensitive indicator dye, such as Methyl Yellow (Color Index No. 19), is distributed in the microcapsule layer, e.g. by dissolving or dispersing the dye in a suitable insulative binder, and the encapsulated matreial is acidic in nature, rupture effects release of the acidic material and causes color change of the acid sensitive dye in the area adjacent the ruptured microcapsule.

Figure 3:
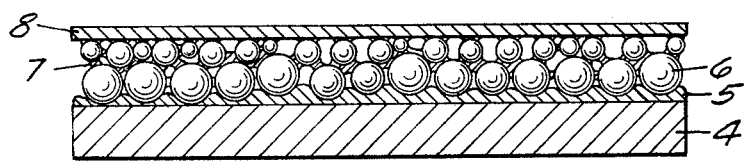
FIGURE 3 is a cross-sectional view of a sheet with a layer of metal-coated microcapsules combined with a top coating.

The microcapsules of this invention can also be used in light sensitive sheet constructions. As shown in FIGURE 3 a sheet having a conductive backing 4, a conductive adhesive layer 5, and a layer of microcapsules 6 in an insulative matrix 7, is provided with a uniform photoconductive topcoating 8. Topcoating 8 represents a composition which alters its electrical conductivity upon exposure to actinic light or other form of radiant energy, thus serving as a light activated current passing device. In such a construction the surfaces of the microcapsules must be electrically conductive and preferably highly electrically conductive. Although the microcapsules of the invention are generally electrically conductive, it is sometimes desirable to increase this conductivity by adding a layer thereto, e.g. by coating with a powdered material such as carbon, aluminum flakes, etc. or by vapor deposition or electroless plating of a metal, such as silver.

Figure 4:
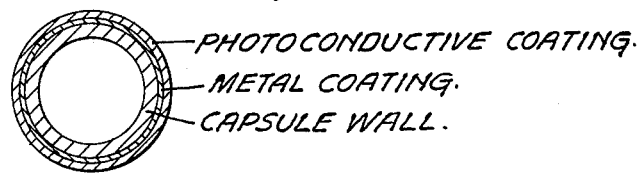
FIGURE 4 is an enlarged cross-sectional view of a metal-coated microcapsule having a further photoconductive coating.

Photoconductive coatings, such as those described in United States Patents Nos. 3,010,884, 3,051,569 and 3,052,540, including a photoconductive material (e.g. zinc oxide, selenium, etc.), dispersed in an insulative binder when in particulate form, are preferred. If desired, such a photoconductive topcoating can alternately be deposited directly on the electrically conductive coating of the microcapsule, as shown in FIGURE 4, completely encasing the capsule. By vapor depositing a photoconductive material directly onto the microcapsules, either before or after their incorporation into a sheet, a thin coating can be provided and the necessity for a binder can be eliminated. Organic as well as inorganic photoconductors may be used.

Figure 5:
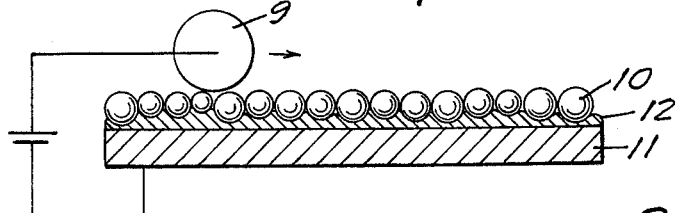
FIGURE 5 is a cross-sectional view of a sheet containing photosensitive, metal-coated microcapsules.

In FIGURE 5 a light sensitive copysheet prepared with the microcapsules as shown in FIGURE 4 is developed, after or during exposure to a light image, by slowly passing a conductive roll 9 over the surface of microcapsule layer 10. The conductive backing 11 of the copysheet is connected to the conductive roll 9 through a source of electrical potential. Either direct or alternating current may be used. As the roll contacts the surface of a microcapsule which has been exposed to light, thereby lowering the resistance across the photoconductive coating in the light struck areas, current passes through the exposed photoconductive coating, the underlying metal coating, the unexposed photoconductive coating at the non-exposed bottom portion of the microcapsule, the electrically conductive adhesive layer 12 and the conductive backing 11. A somewhat more efficient copysheet, providing a greater differential in conductivity ratio between the light struck and background areas, can be achieved by using the copysheet construction of FIGURE 3 with the capsules of FIGURE 1, the microcapsule layer in this embodiment being overcoated, e.g. by vapor deposition, with a suitable photoconductor material. The high current density at those areas of point contact between the microcapsules and between the roll and the microcapsules produces rapid heat generation and consequent thermal rupture of the microcapsule wall, thus releasing the contents and providing a localized visible mark. In place of the roll 9, a brush with metal bristles, multiple styli or other suitable contacting device providing essentially point contact with the microcapsules can be used.

Since two or more reactant materials can be individually encapsulated and then admixed for use as a free flowing capsule mass or as an integral part of a sheet construction, a variety of reactions can be controllably initiated by electrical capsule rupture. For example, certain adhesives normally handled as two-part systems (e.g. epoxy adhesives) can be effectively handled as a one-part system by encapsulating one or more of the reactive components. A tube or other container can be filled with a curable resin and microencapsulated catalyst. By positioning wire contacts on a grid, connected to a source of electrical potential, in the restricted container orifice, selective electrical rupture of the capsules can be achieved as the resin-capsule mixture is removed from the container, releasing the catalyst and initiating the curing reaction. As another example, a light sensitized printing plate can be prepared by admixing light sensitive capsules, some of which contain curable or hardenable resins and other of which contain curing catalysts or hardeners, of the type shown in FIGURE 4. Such capsules are randomly dispersed throughout the capsule layer 10 of the sheet construction shown in FIGURE 5. After exposure of the light sensitive sheet construction to a light image, the sheet or plate can be electrically developed in the manner shown in FIGURE 5, capsule rupture in the light struck areas releasing catalyst and curing or hardening the curable resin or hardenable material in those areas. The uncured resin in the background areas can then be removed by a conventional solvent wash, leaving a raised image firmly adhered to the electrically conductive backing, or by intimately contacting the sheet surface with a roller or another sheet to which the material in the background areas adheres or transfers. If the curable or hardenable resin in such light sensitized printing plates is made electrically conductive, it can be used as the adhesive for bonding a catalyst containing capsule layer to the electrically conductive substrate. When the image and background areas have different wetting properties, such plates or sheets may be used as lithographic masters.

In order to utilize the above techniques for the preparation of full color prints from a positive image, microcapsules of the type shown in FIGURE 4 containing red, green and blue dyes are admixed in random manner and deposited on the copysheet, the photoconductive coatings being selectively sensitized to red, green and blue light corresponding to the colored dye contained therein. When such sheets are exposed to a colored image, only those capsules which are sensitive to the appropriate wave length will become sufficiently conductive to permit current flow and hence capsule rupture and release of the colored dye. A separate exposure and electrical development step for each color is preferred, and color separations or appropriate filters can be employed in this procedure. Since the conductivity of the photoconductive material is proportional to the light exposure, mixing capsules having different coating thicknesses of photoconductor may be used to produce enhanced tone gradation.

In some instances it may be desirable to fix or stabilize the contents released from the microcapsules. For example, a monomeric, partially polymerized or partially cured material released from the microcapsules may be further polymerized or cured by the application of heat with or without the application of a suitable catalyst. If the released microcapsules' contents are reactants capable of further reaction, e.g. dye precursors, the appropriate coreactants may be applied to the sheet after microcapsule rupture, thereby forming a visible image. As an alternative procedure, a second sheet or receptor containing the appropriate coreactants may be brought into contact with the released contents to provide a visible image on the second sheet or receptor. Multiple copies may be prepared in this manner.

EXAMPLE 1

Microcapsules of approximately 5 microns diameter containing toluene dyed deep blue with Sudan Black BR are prepared according to the teaching of French Patent No. 1,323,048. The shells of the capsules are of urea formaldehyde.

The capsules are sensitized by soaking successively in the following aqueous solutions, with intermediate filtration and rinsing:

(a)
Stannous chloride—70 g. per liter
Concentrated HCl—5 cc. per liter (b)
Silver nitrate—5–10 percent aqueous solution (c)
Palladium chloride—0.5 g. per liter
Concentrated HCl—1 cc. per liter The capsules are soaked in solution (a) for approximately 10 minutes at room temperature (about 25° C.) with mild agitation. They are then filtered off and washed with distilled water to remove free stannous and chloride ions. Next they are soaked in solution (b), with mild agitation, until their surfaces have acquired the faint brown coloration characteristic of colloidal silver. Again they are filtered off, and washed to remove excess silver ions. They are then soaked in successive aliquots of solution (c) with mild agitation until the yellow color of the palladium solution is no longer discharged when it is added to the capsules. They are then filtered off, washed thoroughly with distilled water and metal plated by the following procedure.

Five grams of capsules are conveniently coated per liter of the following aqueous bath:

| | Grams per liter |
|---|---|
| $NiCl_2 \cdot 6H_2O$ | 17 |
| $NaH_2PO_2 \cdot H_2O$ | 24 |
| Na acetate | 16 |

The coating bath is prepared fresh. The coating temperature is 60° C. About 25 cc. of the solution is first added to the capsules in a spotlessly clean glass vessel. After a brief induction period, gas evolution (fizzing) is heard as the plating reaction begins. The reaction becomes self sustaining and the gas evolution helps to maintain agitation of the system. The remainder of the plating solution is added in aliquots at a rate sufficient to maintain the effervescence at a steady, even rate.

At the end of the plating reaction, the system becomes quiescent and the spent liquors are decanted off. The plated capsules are washed by decantation with water and then several times in acetone. Under a microscope they are seen to be covered with a continuous, uniform coating of metal (nickel).

A sample of the washed nickel coated microcapsules is immersed in acetone (in a ratio of 20 percent w./v. of fill to acetone) at 25° C. for 15 minutes with agitation. No color appears in the acetone. A sample of the starting microcapsules of this example (with no metal coating) is immersed in acetone (also in a ratio of 20 percent w./v. of fill to acetone) at 25° C. with agitation. Color is apparent very soon after contact and the acetone has turned a dark blue color after 30 seconds of contact. Thus the metal coating has reduced the penetrability of the microcapsules by more than 97 percent.

Furthermore the nickel coated microcapsules of this invention release less than one percent of their fill in a slurry of the microcapsules in acetone in 15 minutes at 25° C. which contains 20 percent w./v. fill: acetone (since as previously shown, they release no color under such circumstances) while a 0.2 percent w./v. solution of the fill in acetone has a distinct blue color.

EXAMPLE 2

Microcapsules of about 5 microns diameter containing toluene dyed deep blue with Sudan Black BR are prepared and sensitized as is described in Example 1.

The sensitized capsules are plated with copper by placing them, with gentle agitation, in an aqueous bath of the following composition:

$CuSO_4 \cdot 5H_2O$—25 grams per liter
2,2′,2″-nitrilotriethanol—60 grams per liter
Sodium hydroxide—16 grams per liter
Formaldehyde 37%—25 cc. per liter
Aqueous solution.

Five grams of capsules are plated by one liter of this solution. The plating bath is warmed to about 30° C. and the capsules are added to about 50 cc. thereof with gentle agitation. After a brief induction period (about 5 minutes) the plating reaction starts. The remainder of the plating solution is added gradually at such a rate that the plating reaction proceeds steadily. After the reaction subsides the copper coated capsules are recovered and washed with water and with acetone, and then soaked in acetone for a few minutes.

These washed copper coated microcapsules are tested using the procedures described in Example 1. It is found that the metal coating has reduced the penetrability of the microcapsules by more than 90 percent and that the microcapsules release less than one percent of their fill in a slurry thereof in acetone in 15 minutes at 25° C. which contains 20 percent w./v. fill: acetone.

EXAMPLE 3

A lot of microcapsules is prepared and sensitized as in Example 1.

These capsules are metal plated with cobalt by gently agitating them in an aqueous solution of the following composition:

| | Grams per liter |
|---|---|
| Cobalt sulfate ($CoSO_4 \cdot 7H_2O$) | 30 |
| $NH_4Cl$ | 50 |
| Sodium potassium tartrate | 75 |
| Ammonia solution (conc.) | 40 |
| Sodium hypophosphite | 40 |

About 5 grams of the capsules and 50 cc. of the plating solution (previously warmed to about 60° C.) are mixed. After a few minutes induction period, the plating reaction starts, and gas is evolved with effervescence. Additional plating solution is added gradually at such a rate as to maintain the gas evolution at a steady pace, a total of one liter being used. After the reaction has subsided, the spent liquors are decanted off and the cobalt plated capsules are washed with water and acetone as in the preceding examples. It is found that the cobalt coating has reduced the penetrability of the microcapsules by more than 90 percent and that the microcapsules release less than one percent of their fill in a slurry thereof in acetone in 15 minutes at 25° C. which contains 20 percent w./v. fill acetone.

EXAMPLE 4

About 0.5 g. of the uncoated starting microcapsules of Example 1 are plated with iron in a freshly prepared and gently agitated aqueous bath of the following composition:

| | Grams per liter |
|---|---|
| Ferrous sulfate | 2 |
| Sodium acetate | 2 |
| Sodium hypophosphite | 3 |

The plating bath is warmed to 65° C. A small aliquot of it, about 50 cc., is mixed with the capsules. After a short induction period the plating reaction is seen to begin and gas bubbles are observed. A total of one liter of the plating solution is added gradually, at such a rate as to maintain an even reaction rate in the plating process. After the reaction subsides the spent plating liquors are removed by decantation and the capsules are washed in the water and acetone as in Example 1. It is found that the iron coating has reduced the penetrability of the microcapsules by more than 90 percent and that the microcapsules release less than one percent of their fill in a slurry thereof in acetone in 15 minutes at 25° C. which contains 20 percent w./v. fill acetone.

EXAMPLE 5

Microcapsules of 50–100 microns diameter containing dibutyl phthalate dyed deep blue with Sudan Black BR are prepared according to the teachings of French Patent No. 1,323,048.

These microcapsules are coated with nickel using the process of Example 1 except that the temperature of the nickel plating bath is 65° C. Care is taken throughout the process to avoid damaging capsules, and any fill which appears (e.g. due to capsule damage from mechanical shock) is removed. It is found that the resulting nickel coating has reduced the penetrability of the microcapsules by more than 90 percent and that the microcapsules release less than one percent of their fill in a slurry thereof in acetone in 15 minutes at 25° C. which contains 20 percent w./v. fill acetone.

EXAMPLE 6

Microcapsules containing water for fill having shells of polyethylene, and diameters of about 1500 microns are cleaned by contacting them for about five minutes with nitric acid at room temperature. They are washed thoroughly with water and then contacted for five minutes with a solution of stannous chloride (70 grams per liter) in dilute hydrochloric acid (40 cc. per liter of water).

They are filtered off and washed with water, and then contacted with aqueous silver nitrate solution (ca. 10 percent) for 5 minutes. After another filtration and washing step they are soaked in palladium chloride solution (0.5 gram per liter with added HCl, 1 cc. per liter) for an hour.

After filtering and washing, they are contacted with the following solution, freshly prepared, at about 40–50° C.

|  | Grams per liter |
|---|---|
| Nickel chloride | 17 |
| Sodium hypophosphite | 24 |
| Sodium acetate | 16 |

After an induction period, the plating reaction starts. A fine, bright metalic nickel coat is formed after about 12 hours.

EXAMPLE 7

A portion of the nickel coated capsules of Example 5 are coated with silver to render their surfaces highly electrically conductive as follows:

To a solution of 12.5 grams of $AgNO_3$ in 250 cc. of distilled water are added drop-wise with constant stirring, about 16.0 cc. of 28 percent $NH_4OH$ until the solution is almost clear, after going through a deep brown turbidity. About 25.0 gm. of the nickel coated capsules are then immersed in this bath and wetted and a solution of 8.0 gm. of anhydrous dextrose dissolved in 25.0 cc. distilled $H_2O$ and 125.0 cc. of a solution of 10 percent KOH in distilled $H_2O$ are added. After three minutes of further stirring, the capsules are removed from the solution and washed with $H_2O$. A silver coating of high electrical conductivity has been imparted to the microcapsules.

An electroconductive layer of carbon black using lacquer as a binder or film former about 25 microns (i.e. .001 inch) in thickness is spread over a sheet of paper-backed aluminum foil. A mono-layer of the electroconductive silver coated capsules is then embedded in the carbon black so that the individual capsules are in contact over a portion of the surfaces of their lower hemispheres with the carbon black, and at their bottoms with the aluminum foil, while their upper hemispheres are exposed. A thin layer of a mixture consisting by weight of 10 parts of titanium dioxide to 1 part of lacquer solids in a volatile organic solvent is then applied to the whole laminate so as to leave the top portion of each capsule exposed and uncovered. After the solvent has evaporated, a thin electrically insulating layer of lacquer and titanium dioxide remains. A thin layer of a photoelectrically conductive substance consisting by weight of 10 parts of indium oxide to 1 part of lacquer solids in a volatile organic solvent is then spread over the whole in a continuous layer sufficiently thick to cover the capsules, and allowed to dry by evaporation of the solvent. This last layer is applied in the presence of red light, inasmuch as the indium oxide is relatively more sensitive to other portions of the light spectrum.

This is kept in the dark until it is exposed to a 350 watt photoflood reflector type bulb through a patterned mask onto the photoconductive surface at a distance of about 18 inches. After a 10 minutes exposure the light is turned off and the mask is removed. An electric current is passed through the laminated sheet by connecting the negative pole of a 15 volt direct current source with the aluminum foil base sheet, and stroking the surface of the photoconductive top coat with a soft aluminum-bristled brush, which is connected to the positive pole of the direct current sourse. After stroking the surface lightly and briefly so that all areas are electrically contacted at least once, the pattern of the mask appears in blue where the surface had been exposed to the light. The laminate is then examined microscopically, and it is observed that in the areas now visibly colored blue, the dye has been released from the capsules which previously contained it.

Although the above description relates primarily to image recording it is also desirable to employ the microcapsules in the encapsulation of various materials, preferably liquid in nature, such as perfumes, pesticides, flavors, surfactants, solvents, drugs, etc.

Various other embodiments of the present invention will be apparent to those skilled in the art without departing from the spirit or scope thereof.

What is claimed is:

1. The process for forming on microcapsules containing a fill capable of permeating the shell thereof, a continuous metal coating which reduces the permeability of the microcapsule by at least 90 percent which comprises (1) catalytically pretreating microcapsules by successively immersing them in aqueous solutions of pH 3 to 11 which are
      (a) 0.1 to 2 molar with respect to stannous ion,
      (b) 0.1 to 2 molar with respect to silver ion and
      (c) 0.01 to 0.5 molar with respect to palladium ion,
   (2) metal coating the pretreated microcapsules by immersing them in an aqueous solution which is 0.001 to 0.5 molar with respect to a metallic ion which is capable of electroless deposition onto a dielectric surface, said solution being buffered to pH 3 to 11 and containing a reducing agent for the metalic ion, the duration of treatment in solutions (a) and (b) being sufficient that the surfaces of the microcapsules turn the pale brown color of colloidal silver in solution (b) and the duration of treatment in solution (c) being sufficient that the pale brown color disappears from the surfaces of the microcapsules and the yellow color of the palladium ion remains in the solution.

2. The process according to claim 1, wherein the microcapsules are coated with nickel.

3. The process according to claim 1, wherein the microcapsules are coated with cobalt.

4. The process according to claim 1, wherein the microcapsules are coated with copper.

5. The process according to clami 1, wherein the microcapsules are coated with iron.

References Cited

UNITED STATES PATENTS

| 2,721,737 | 10/1952 | Hochberg | 117—100 X |
| 2,757,104 | 7/1956 | Howes | 117—54 X |
| 2,762,714 | 9/1956 | Smith et al. | 117—54 X |
| 3,011,920 | 6/1959 | Shipley | 117—160 X |
| 3,058,845 | 10/1962 | Hendricks | 117—160 X |
| 3,105,772 | 10/1963 | Loiseleur | 117—54 X |
| 3,119,709 | 1/1964 | Atkinson | 117—47 |
| 3,138,479 | 6/1964 | Foley | 117—47 |
| 3,329,817 | 7/1967 | Walz | 117—100 X |
| 2,939,804 | 6/1960 | Schossberger et al. | 117—71 |
| 3,080,251 | 3/1963 | Claus | 117—17.5 |
| 3,140,175 | 7/1964 | Kaprelian | 96—1.2 |
| 3,276,869 | 10/1966 | McCune | 96—3 |
| 3,318,697 | 5/1967 | Shrewsbery | 96—1 |

WILLIAM D. MARTIN, Primary Examiner

M. R. P. PERRONE, Assistant Examiner

U.,S. Cl. X.R.

96—1.5; 117—33, 34, 55, 160, 216, 217; 252—62.1, 316